MAGNETIC TAPE REPRODUCING SYSTEM

Filed Aug. 22, 1960

STEWART L. SMITH
INVENTOR.

BY

Robert G. Clay
ATTORNEY

United States Patent Office 3,099,708

Patented July 30, 1963

3,099,708

MAGNETIC TAPE REPRODUCING SYSTEM

Stewart L. Smith, Palo Alto, Calif., assignor to Ampex Corporation, Redwood City, Calif., a corporation of California Filed Aug. 22, 1960, Ser. No. 51,058
5 Claims. (Cl. 178—6.6)

Figures 1, 2:
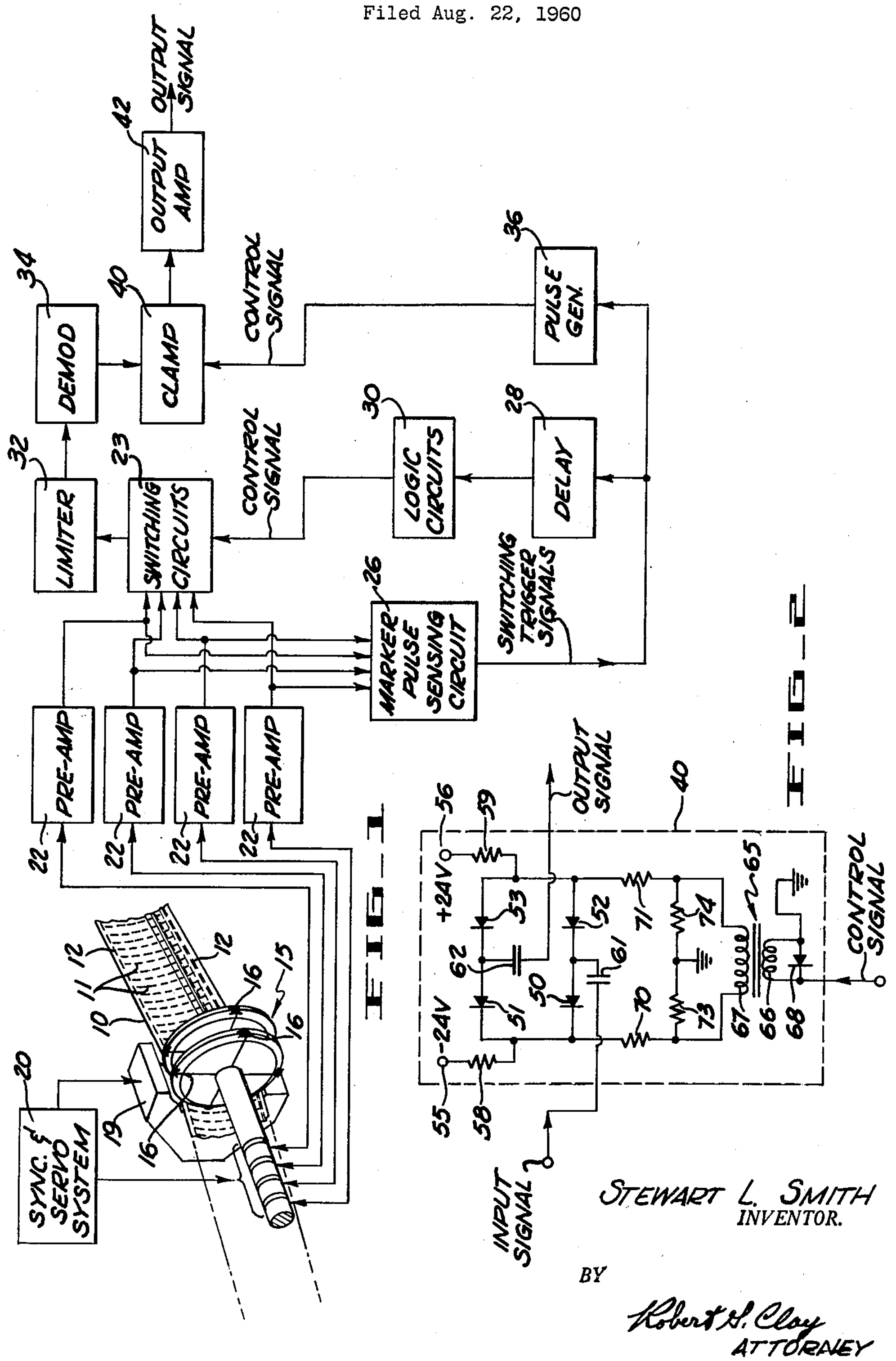

This invention relates to wideband signal reproducing systems, and more particularly to wideband magnetic tape systems which use a number of reproducing heads in a sequential fashion.

Particularly efficient and versatile magnetic tape recorders and reproducers utilize head assemblies which move at least partially transversely, instead of solely longitudinally, relative to the tape. By introducing head movement in the transverse direction, very high head to tape speeds are attained, thus permitting the recording and reproduction of a wide band of frequencies with improved fidelity. Such systems also provide very high information packing densities, even though the speed of the tape itself is relatively low. Accuracy and reliability are achieved because a number of ways are provided by which control may be exercised over the relative speeds and positions of the head assemblies and the magnetic tape with comparative simplicity. The versatility of the systems is enhanced by the fact that longitudinal tracks may be utilized for additional audio or timing information.

While systems that employ the above principles have been widely used in television recording, they are also of primary significance to a growing number of other applications. Modern technology is increasingly concerned with high speed phenomena and the processing of vast amounts of operational data. Wideband recording systems are uniquely suited for these purposes, because through their use, data may be stored and later analyzed in extremely convenient fashion. One particular form of wideband recording system for these purposes utilizes a pair of rotating head assemblies, each having four heads, which are mounted to rotate about an axis parallel to the direction of movement of the tape. As they rotate, the heads sweep out parallel, closely spaced, transverse recording tracks from which information may later be reproduced. For mobile applications, space and weight are conserved by limiting the functions of the system to recording only, but it is a feature of these systems that like machines are compatible with each other so that any machine may reproduce data from a tape recorded by another machine of its type.

In using such systems to gather data for further processing or analysis, however, certain problems may be encountered when the data is reproduced. In order to reproduce the information signals in a continuous, but not overlapping sequence, a switching circuit is coupled to the magnetic heads for sequentially selecting output signals from a single head at a time. The reproduced information is usually frequency modulated, and the switching action introduces a discontinuity in the carrier which produces a transient on subsequent demodulation of the signal. The transients present in the signal information may in turn interfere with the information which has been recorded.

It is therefore an object of the present invention to provide an improved wideband magnetic tape reproducing system.

Another object of the invention is to provide an improved magnetic tape reproducing system using a number of sequentially operated heads, in which data is reproduced with extremely high speed and accuracy.

A further object of the invention is to eliminate switching transients produced in certain previously known tape reproduction systems.

A tape reproducing system, in accordance with the present invention, utilizes timing information derived from the magnetic tape to maintain the signal level of the demodulated signal substantially constant during an interval in which transients might be present. In one particular example of a system in accordance with the invention, frequency modulated data signals containing time marker pulses are reproduced from transverse tracks on a magnetic tape by a rotating head assembly. The output signals from the individual heads are sequentially selected by switching circuits which are controlled in time of operation by the marker pulses. Following recombination at the switches, the signals are demodulated and presented as wideband video signals. In accordance with the invention, however, the marker pulses which are used to actuate the switches are applied to the switches only after a selected delay, and are also applied to a gated clamping circuit which is coupled to the output circuit of the demodulator. This gated clamping circuit is of a type sometimes characterized as a transmission-type gate. The data signal provided to the demodulator during the switching interval is demodulated, but because of the action of the gated clamping circuit, the output signal from the system is maintained for this brief interval at the previous signal level of the demodulated signal. Accordingly, the reproduced signal is free of the transients formerly generated by the action of the switching circuit.

A better understanding of the invention may be had by reference to the following description, taken in conjunction with the accompanying drawings, in which:

FIGURE 1 is a block diagram representation, in simplified form, of a wideband magnetic tape reproducing system in accordance with the present invention; and FIGURE 2 is a schematic diagram of a circuit which is employed in the arrangement of FIGURE 1.

Referring now to FIGURE 1, magnetic tape 10 from which data is to be reproduced is shown only in generalized form and, for simplicity, supply and takeup reels, compliance means and tape guide means have been omitted. For broadband recording, a relatively wide tape 10, such as a two-inch tape, is employed and data is recorded in transverse tracks 11 extending across the tape. Because of the relative motion between the recording head and the tape 10 while the tape is moving, the transverse tracks 11 are slightly oblique. For the type of application which is here under discussion, the tracks 11 may be approximately 0.010 inch wide and have a center-to-center spacing of approximately 0.015 inch, thus providing an extremely high signal density as well as broad frequency band recording. For linear frequency response over a wide range and for achieving uniformity in the recording and reproduction of signals even though different heads are used, the signal information recorded in the transverse tracks 11 is frequency modulated.

Longitudinal tracks 12 are also provided along the edges of the tape 10 for the recordation of audio and timing information. Data signals are reproduced from the transverse tracks 11 by a dual rotating head assembly 15, which rotates about an axis parallel to the direction of longitudinal movement of the tape 10. A group of four heads 16 is symmetrically disposed about the outer periphery of each of the rotating disks in the dual head assembly 15. The tape 10 is cupped in the transverse direction by a concave guide 19, which provides contact between the tape 10 and the heads 16 as they rotate. A synchronizing and servo system 20, shown only in generalized form, cooperates with the dual head assembly 15 and the concave guide 19 to maintain the heads 16 in precise relation to the transverse tracks 11 during signal reproduction. In order to shorten the description, elements, such as the heads associated with longitudinal tracks 12, and units which function only during recording, have been omitted.

For control of timing in the reproduction process, marker pulses are inserted in the data recorded on the tape 10. These marker pulses are approximately two microseconds in duration and ten microseconds apart. It should be noted that the marker pulses may be recorded on one of the longitudinal tracks 12, as part of the data in the transverse tracks 11, or with some other arrangement, depending upon the manner in which it is desired to separate the marker pulses from the other recorded signals.

Each of the heads 16 in a disk of the dual head assembly 15 is conventionally coupled, as shown diagrammatically in FIGURE 1, through a separate preamplifier 22 to switching circuits 23. The switching circuits 23 are preferably electronic circuits, operated by control signals as described below, and constitute the equivalent of a single pole, four throw relay. Signals derived from the preamplifiers 22 are also applied to a marker pulse sensing circuit 26, which senses the occurrence of marker pulses in the recorded data and provides switching trigger signals of very short duration in response. Here the switching trigger signals are applied through a delay circuit 28 to switching control logic circuits 30, which provide control signals to operate the switching circuits 23. The delay circuit 28 is selected to provide a delay of 0.5 microseconds. The logic circuits may here consist of a commutator type of device, although it will be recognized that a great many alternative expedients are available for performing the function of the switching circuits 23 and the logic circuits 30 in response to the switching trigger signals.

The data signals from the switching circuits 23 are combined as a time varying, frequency modulated signal, which may include discontinuities in the carrier at times corresponding to the switching intervals. The recombined signal is passed through a limiter circuit 32 and demodulator circuits 34, output signals from which are the video data signals. At intervals, the sharp trigger pulse which is applied to the delay circuit 28 is also applied without delay to a pulse generator 36 which is coupled to the control input of a gated clamp circuit 40. Signal inputs are applied to the gated clamp circuit 40 from the demodulator circuit 34. Output signals derived from the gated clamp circuit 40 are passed through an output amplifier 42 as the output signals from the system. As described above, these signals may be recorded, further analyzed, used to actuate a display or to control a simulation system.

The pulse generator 36 provides, in this example, a pulse of one microsecond duration to the control input of the gated clamp circuit 40. A number of circuits are available for performing the function of the pulse generator 36, but a monostable multivibrator is preferred in the present instance. The gated clamp circuit 40, a detailed example of which is given hereinafter in conjunction with FIGURE 2, operates to pass the signal from the demodulator circuits 34 to the output amplifier 42 except in the presence of a control input signal, during which the signal level from the gated clamp circuit 40 is maintained at the last previous level established by the demodulator circuits 34.

In operation, therefore, the magnetic tape reproducing system of FIGURE 1 sequentially utilizes the output signals from the individual heads 16 of the head assembly 15. Frequency modulated signals picked up by the heads 16 are recombined in the switching circuits 23 to form continuous data signals, at precise times determined by the switching trigger signals, which are applied to the logic circuits 30. Each switching action is however, delayed by a very brief interval (0.5 microsecond) by passage of the switching trigger signals through the delay circuit 28.

The undelayed switching trigger signal, when applied to the pulse generator 36, initiates a relatively brief but precisely defined pulse to control the gated clamp circuit 40. This control signal for the gated clamp circuit 40 effectively encompasses, in time, the time increment in the data signals during which switching takes place in the switching circuits 23. Immediately prior to the switching, therefore, the output signals from the system are stabilized at their existing level by the gated clamp circuit 40; immediately following termination of the time increment devoted to the switching interval, the clamping action is released and the output signal from the demodulator circuit 34 is applied as the system output signal. Because of the extremely brief duration of the clamping action (one microsecond) and because of the fact that video signals are being processed, data is not lost by this operation.

An example of a gated clamp circuit 40, which has particular advantages in the arrangement of FIGURE 1, is provided in FIGURE 2. In FIGURE 2, four diodes 50, 51, 52 and 53 are arranged in a bridge between a negative voltage source 55 (here minus 24 volts) and a positive voltage source 56 (here plus 24 volts). The diodes 50–53 in the bridge are coupled to the voltage sources 55, 56 through a pair of resistors 58, 59, respectively, and are, in the normal state, forward biased and thus conducting. Input signals (from the demodulator circuit 34 of FIGURE 1) are applied to an intermediate point between one pair of adjacent diodes 50, 52 of the bridge through a coupling capacitor 61. Output signals are taken through another coupling capacitor 62 from an intermediate point between the other diodes 51, 53 of the bridge.

Control signals for the gated clamp circuit (from the pulse generator 36 of FIGURE 1) are applied to the primary winding 66 of a transformer 65, across which primary winding is coupled a diode 68. The secondary winding 67 of the transformer 65 is coupled across the ends of the bridge through a symmetrically disposed pair of resistors 70, 71. The opposite ends of the secondary winding 67 of the transformer 65 are shunted by a pair of like resistors 73, 74 which are coupled in series, with the midpoint of the series path being coupled to ground.

In the operation of the gated clamp circuit of FIGURE 2, a data signal, including switching transients which may occur during the switching intervals, is applied to the bridge from the input terminal through the capacitor 61. Because of the forward bias established on the diodes 50–53 by the arrangement of the negative and positive voltage sources 55 and 56 respectively, the signal variations at the input terminal are applied to the output terminal. A positive control signal pulse of the selected duration applied to the primary winding 66 of the transformer 65 causes a positive-going voltage excursion at the side of the bridge which is adjacent the negative voltage source 55, and a negative-going voltage excursion at the side of the bridge which is adjacent the positive voltage source 56. For the clamping interval determined by the length of the control signal pulse, the diodes 50–53 are reverse biased thereby and are driven to non-conduction. Accordingly, the input signal is effectively isolated from the output terminal, and signal variations in the input signal during the clamping interval do not appear at the output. Furthermore, the reverse-biased diodes 51, 53 in the output side of the bridge present an extremely large impedance between their common connection and ground. From the output terminal, the diodes 51, 53 and the coupling capacitor 62 appear as the principal elements of a series R-C network to ground. While reverse-biased, these diodes provide a large time constant for this R-C network. Thus during the clamping interval the output terminal is advantageously maintained at a substantially constant level of potential established by the last previous input signal level so as to eliminate the spurious transient more effectively. This arrangement is particularly fast acting and stable. The diode 68 which is coupled across the primary 66 of the transformer 65 presents a low impedance circuit of a polarity which tends to prevent overshoot at the trailing edge of the control signal pulse, and thus insures rapid return of the system to normal operation following termination of the clamping interval.

While there have been described above and illustrated in the drawings various features of a magnetic tape reproducing system in accordance with the invention, it will be appreciated by those skilled in the art that a number of modifications and alternatives may be employed. Accordingly, the invention should be considered to include all variations falling within the scope of the appended claims.

What is claimed is:

1. An electronic information processing system for reproducing information recorded transversely on magnetic tape and including spaced marker pulses comprising a number of transducers for successively scanning the recorded information on the tape, marker pulse sensing means responsive to marker pulses from the transducers, switching means coupled to the transducers and responsive to the sensing means for deriving information signals from the transducers sequentially in accordance with the marker pulses, means for applying a predetermined delay to such derived information signals coupled to said switching means, demodulating means coupled to the switching means, and output clamping means coupled to the demodulator means and to the sensing means for providing an output signal representative of the reproduced information signals presented by the demodulator means despite the generation of transients by the switching means.

2. A system for reproducing data recorded in transverse tracks on magnetic tape, the data including periodic marker pulses, comprising a rotating head assembly having a number of reproducing heads successively scanning the transverse tracks on the tape, signal switching means coupled to the reproducing heads of the rotating head assembly for recombining signals from the individual heads sequentially into a substantially continuous data sequence, means for providing switching trigger signals to control the switching means in response to the marker pulses, delay means coupled between the trigger signal means and the switching means, demodulator means coupled to receive the recombined signals from the switching means, and output clamping means coupled to receive demodulated signals from the demodulator means and responsive to the signals from the switching trigger means for blocking signals from the demodulator means and maintaining the output signal from the system substantially at the last previous level of the signal from the demodulator means on the occurrence of a switching trigger signal.

3. A wideband data reproducing system for reproducing data recorded in transverse tracks on a magnetic tape, the transverse tracks including periodic marker pulses and the data being recorded in frequency modulated form, the system comprising in combination a head assembly which is rotatable adjacent to the magnetic tape and has a number of reproducing heads successively scanning the transverse tracks of the tape, controllable switching means coupled to the reproducing heads of the rotatable head assembly for recombining, in response to switching control signals, the signals from the reproducing heads in sequential fashion to provide a single-channel data signal which is subject to discontinuity of the F-M carrier at the switching intervals, means responsive to the marker pulses for generating switching trigger signals, delay means coupled to receive the switching trigger signals and provide a predetermined delay therein, logic control circuits coupled to receive the delayed switching trigger signals and provide switching control signals to the controllable switching means, a pulse generator responsive to the undelayed switching trigger signals for providing clamping control signals having a selected duration, demodulator means coupled to receive the recombined signals from the switching means for providing video signals, and output clamping means responsive to the video signals from the demodulator means and the clamping control signals from the pulse generator, the output clamping means operating to transmit video signals from the demodulator means as output signals from the system but maintaining output signals from the system at the last signal level of the video signal from the demodulator means during the application of clamping control signals, the selected duration of clamping control signals being of sufficient time to encompass the switching interval defined by the associated switching trigger signals.

4. A system for reproducing data recorded on a magnetic tape with a rotary head assembly having a number of magnetic heads sequentially scanning the tape, the data signals being modulated and the tape including time marker pulse data, comprising the combination of controllable switching means coupled to the magnetic heads for sequentially recombining signals from the individual heads into a continuous orderly sequence in response to switching control signals, means responsive to the time marker pulses for controlling the time of operation of the switching means, means coupled to the switching means for receiving the recombined sequence of signals to demodulate the signals, and means coupled to said recombined signal receiving means for maintaining an output signal at the last previous signal level established by the demodulated signal for an interval which encompasses the switching interval in which the switching means switches from one head to the next.

5. An electrical information reproducing system for a magnetic tape storage medium wherein a plurality of transducers are successively moved into scanning relationship with the magnetic tape and the transducer outputs are sequentially switched into connection with a signal transmission path in response to periodic marking signals comprising in combination a trigger pulse generator responsive to the marking signals for generating a trigger pulse of a predetermined time duration, a second pulse generator connected to the trigger pulse generator for producing a pulse of a greater time duration than the trigger pulse, a transmission-type gating means inserted in the signal transmission path and connected to the second pulse generator for blocking the transmission path during the occurrence of the pulse therefrom, switching means responsive to the trigger pulse, and a delay circuit connected between the trigger pulse generator and the switching circuit for providing a predetermined time delay to the trigger pulse so that switching of the transducer outputs occurs during the period that the transmission gate is blocked.

References Cited in the file of this patent

UNITED STATES PATENTS

| | | |
|---|---|---|
| 2,651,753 | Buyer | Sept. 8, 1953 |
| 2,784,257 | Earp | Mar. 5, 1957 |
| 2,964,657 | Page | Dec. 13, 1960 |

OTHER REFERENCES

Journal of the SMPTE, vol. 66, April 1957, pages 184–188.